(12) United States Patent
Schunicht

(10) Patent No.: US 6,501,442 B2
(45) Date of Patent: Dec. 31, 2002

(54) METHOD AND APPARATUS FOR GRAPHICAL DISPLAY OF MULTIPLE NETWORK MONITORS OVER MULTIPLE INTERVALS

(75) Inventor: Geoffrey A. Schunicht, Spring, TX (US)

(73) Assignee: Compaq Information Technologies Group, L.P., Houston, TX (US)

(*) Notice: Subject to any disclaimer, the term of this patent is extended or adjusted under 35 U.S.C. 154(b) by 0 days.

(21) Appl. No.: 09/789,372

(22) Filed: Feb. 20, 2001

(65) Prior Publication Data

US 2001/0008401 A1 Jul. 19, 2001

Related U.S. Application Data

(63) Continuation of application No. 09/098,030, filed on Jun. 15, 1998, now abandoned.

(51) Int. Cl.[7] .................................. G09G 5/00
(52) U.S. Cl. ................... 345/2.1; 345/619; 709/224
(58) Field of Search ..................... 345/1.1, 1.2, 2.1, 345/2.2, 2.3, 3.1, 619, 650, 676; 713/320; 709/217, 220, 223, 224, 225, 226

(56) References Cited

U.S. PATENT DOCUMENTS

| | | | |
|---|---|---|---|
| 5,594,859 A | * | 1/1997 | Palmer et al. ............... 345/2.1 |
| 5,666,538 A | * | 9/1997 | DeNicola ................... 713/320 |
| 5,825,336 A | * | 10/1998 | Fujita et al. ................ 345/2.3 |
| 5,990,852 A | * | 11/1999 | Szamrej ..................... 345/753 |

\* cited by examiner

Primary Examiner—Xiao Wu
(74) Attorney, Agent, or Firm—Akin Gump Strauss Hauer & Feld, LLP

(57) ABSTRACT

A method and apparatus for displaying multiple communication network monitors having multiple monitoring intervals on a single graphical display. A user, through an input device, selects an object relating to a network monitor to be displayed on a graph and a processor retrieves network data from a communication network pertaining to the selected object. The display values for a line on the graphical display represented by the monitor are calculated by the processor such that, the line and any previously existing lines, are coherent in that the displayed parameters are consistent across the lines. Once the display values are calculated, the line is displayed on an output device. The user may additionally modify parameters associated with the monitor or add or delete a monitor. If the user modifies a parameter, the processor modifies the parameter and updates the display. If the user adds a new monitor, the processor verifies that the new monitor is consistent with current monitors, and if so, the new monitor is added and the graphical display is updated. Otherwise, an error message is displayed. If the user deletes a monitor, the processor verifies that the line associated with the monitor is not the last line on the graph and removes the line. Otherwise, if the line is the last line, an error message is displayed.

15 Claims, 3 Drawing Sheets

METHOD AND APPARATUS FOR GRAPHICAL DISPLAY OF MULTIPLE NETWORK MONITORS OVER MULTIPLE INTERVALS

This is a continuation of Application Ser. No. 09/098,030, filed Jun. 15, 1998, and now abandoned.

AUTHORIZATION PURSUANT TO 37 C.F.R. 1.71 (E)

A portion of the disclosure of the patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE TO RELATED APPLICATIONS

This application is related to the following U.S. Patent Applications:

U.S. application Ser. No. 09/098,026 entitled "Method and Apparatus for Discovering Network Devices Using Internet Protocol and Producing a Corresponding Graphical Network Map", filed Jun. 15, 1998, pending.

U.S. application Ser. No. 09/098,027 entitled "Method and Apparatus for Automatic Monitoring of Simple Network Management Protocol Manageable Devices", filed Jun. 15, 1998, pending.

U.S. application Ser. No. 09/098,016 entitled "Method and Apparatus for Sending Address in the Message for an E-Mail Notification Action to Facilitate Remote Management of Network Devices", filed Jun. 15, 1998, pending.

U.S. application Ser. No. 09/098,031 entitled "Method and Apparatus for Verifying Network Devices using Simple Network Management Protocol", filed Jun. 15, 1998, pending.

All of the above applications are assigned to the assignee of the present invention, and are hereby incorporated herein in their entirety.

FIELD OF THE INVENTION

The present invention pertains in general to monitoring of communication networks, and more particularly, but not by way of limitation, to a method and apparatus for effectuating graphical display of multiple network monitors over multiple intervals on a single unified graphical display.

BACKGROUND OF THE INVENTION

Communication networks are changing the way people communicate, distribute, and share information. There are many different ways information can be accessed, shared, or communicated on a network. For example, networks are used to access software applications running on a file server, to send e-mail to someone in another country, and to access information on remote computer servers. Networks consists of many different devices connected together in some form to allow one device to benefit from another. These devices include, but are not limited to switches, routers, repeaters, hubs, terminals, servers, queuing devices, and peripheral equipment such as printers, modems, and scanners. Communication networks allow the user to access remote programs and remote databases either of the same organization or form other enterprises or public sources. They also provide communication possibilities faster than other facilities. Because of these optimal information and communication possibilities, computer networks often increase the organizational learning rate, which many authors declare as a fundamental advantage in competition.

These benefits, however, do not come without their problems. Network systems can be very complex with complex problems which are difficult to identify and solve. To help identify network problems and solutions, network management tools have been developed to monitor networks and identify problems or potential problems associated with the networks. Frequently, these tools allow the user to view the results from a monitor on a graphical display. These displays, however, include only a single monitor over a single interval. To display multiple monitors separate displays are required for each monitor and interval.

It would be advantageous, therefore, to devise a method and apparatus which effectuate graphical display of multiple monitors having different intervals and on different devices.

SUMMARY OF THE INVENTION

The present invention comprises a method and apparatus for displaying multiple communication network monitors having multiple monitoring intervals on a single graphical display. A user, through an input device, selects an object relating to a network monitor to be displayed on a graph and a processor retrieves network data from a communication network pertaining to the selected object. The display values for a line on the graphical display represented by the monitor are calculated by the processor such that the line and any previously existing lines are coherent in that the displayed parameters are consistent across the lines.

Once the display values are calculated, the line is displayed on an output device. The user may additionally modify parameters associated with the monitor or add or delete a monitor. If the user modifies a parameter, for example the poll rate, the processor modifies the parameter and updates the display. If the user adds a new monitor, the processor verifies that the new monitor is consistent with current monitors, and if so, the new monitor is added and the graphical display is updated. Otherwise, an error message is displayed. If the user deletes a monitor, the processor verifies that the line associated with the monitor is not the last line on the graph and removes the line. Otherwise, if the line is the last line, an error message is displayed.

BRIEF DESCRIPTION OF THE DRAWINGS

A more complete understanding of the present invention may be had by reference to the following Detailed Description and appended claims, when taken in conjunction with the Drawings wherein:

DETAILED DESCRIPTION OF THE INVENTION

An example of the utilization of the present invention can be found in Compaq's Netelligent Management Software, the user guide of which (5th edition) (Appendix A) is incorporated herein by reference.

Figure 1:
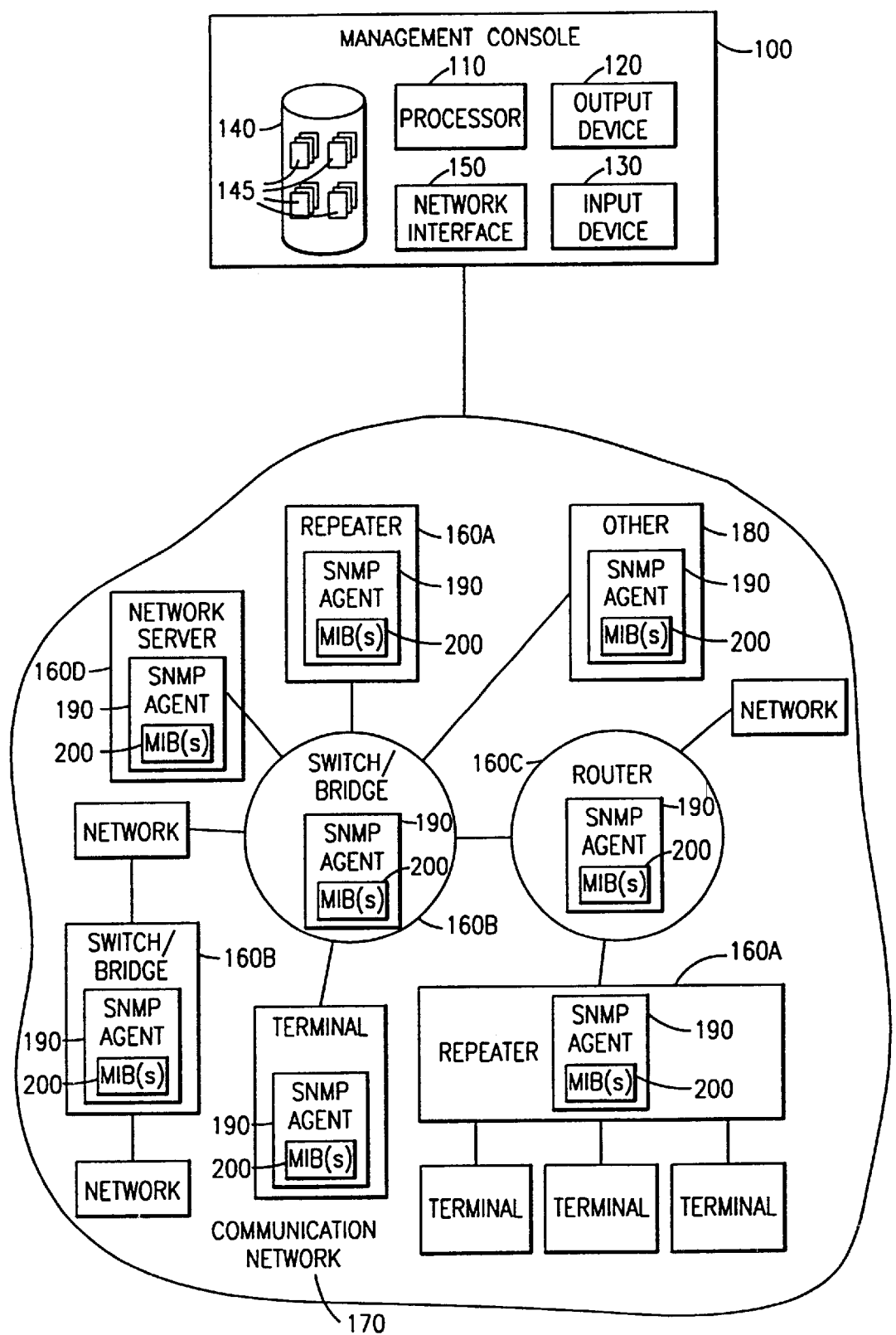
FIG. 1 is a functional block diagram of an apparatus for effectuating a graphical display of multiple monitors associated with devices which are manageable using Simple Network Management Protocol over multiple intervals on a single graphical display.

Referring now to FIG. 1, there is illustrated a functional block diagram of an apparatus for effectuating a graphical display of multiple monitors associated with devices which are manageable using Simple Network Management Protocol over multiple intervals on a single graphical display. A management console 100 comprising a processor 110, an output device 120 such as a video display or a printer, an input device 130 such as a keyboard or floppy disk drive, a storage device 140 such as Random Access Memory (RAM) or a disk drive, and a network interface 150 communicates with various network devices 160 and other devices 180 across a communication network 170. As will be understood from the following disclosure, by "monitors" is meant a monitored data source that is almost any data value that changes over time, the data being from almost any network device on a polled frequency where the polling frequency may be changed by a user while being monitored.

Various network devices 160 reside within the communication network 170 and are manageable using Simple Network Management Protocol (SNMP). SNMP is a communication network management protocol which is commonly know in the industry. SNMP defines a set of variables that an entity in a communication network maintains and consists of three parts: a Structure of Management Information (SMI), Management Information Base (MIB) and the protocol itself. The MIB also includes MIBII which is a particular instance of a MIB. Although various versions of SNMP may exist, the present invention is equally applicable to each version.

The network devices 160 include, but are not limited to, such devices as repeaters 160A, switch/bridges 160B, routers 160C and network servers 160D. Various other devices 180 may also reside within the communication network 170 which are manageable using SNMP but which are not necessarily "communication network" type devices. Examples of other devices 180 include, but are not limited to, workstations and printers.

Within each SNMP manageable device, which includes network devices 160 and other devices 180, resides an SNMP agent 190. The SNMP agent 190 implements one or more MIB(s) including MIBII 200 which define the set of variables of database needed to monitor and control components in the communication network 170 such as, but not limited to, the network devices 160 and other devices 180. Using SNMP, the processor 110 located within the management console 100 accesses the SNMP agents 190 to retrieve information contained within the MIBs 200 and effectuates a graphical display of multiple monitors over multiple intervals. The processor 110 stores the information within storage files 145 located within the storage device 140.

Figure 2A:
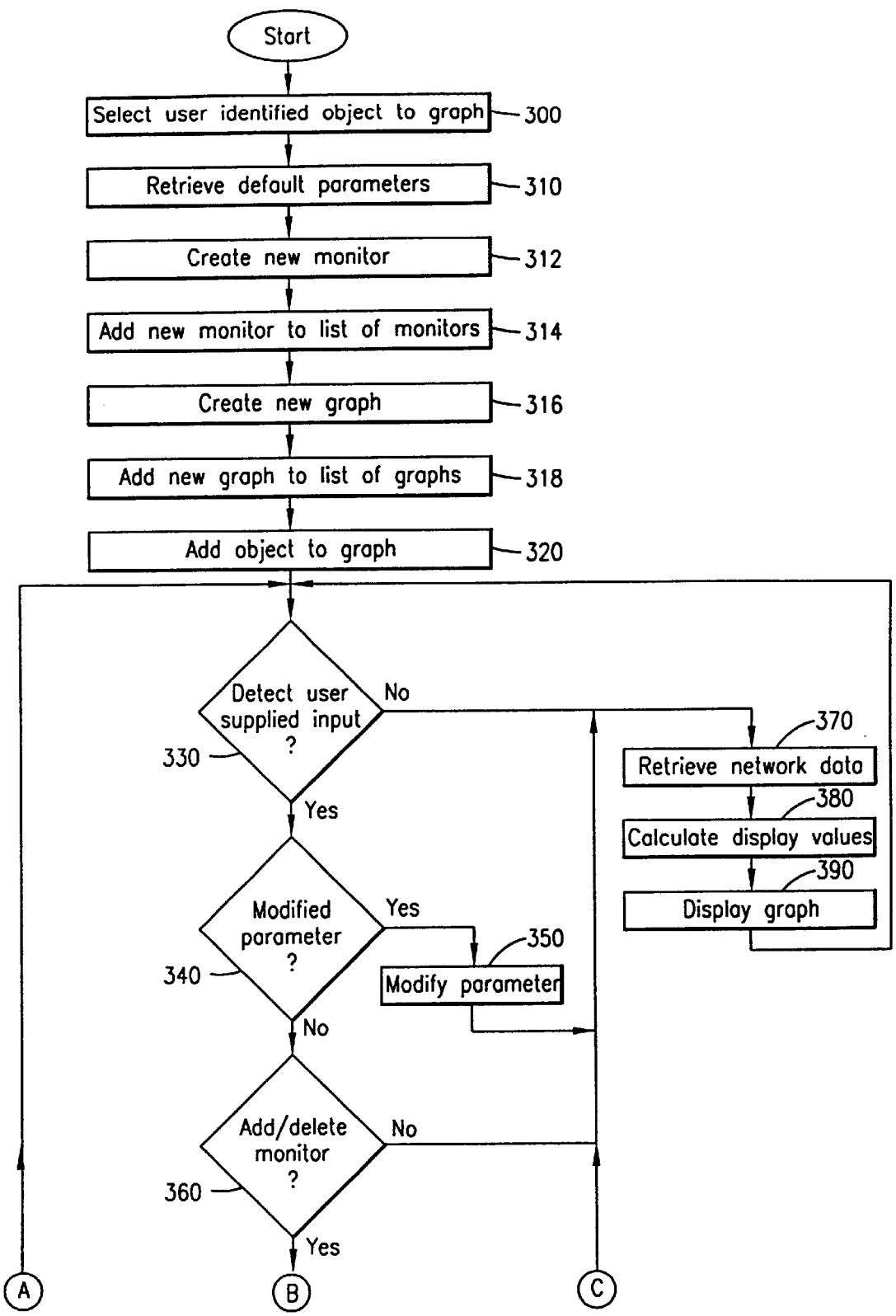
FIGS. 2A–B is a flow diagram of a method for effectuating a graphical display of multiple monitors associated with devices which are manageable using Simple Network Management Protocol over a multiple intervals on a single graphical display consistent with the apparatus described in FIG. 1.
Figure 2B:
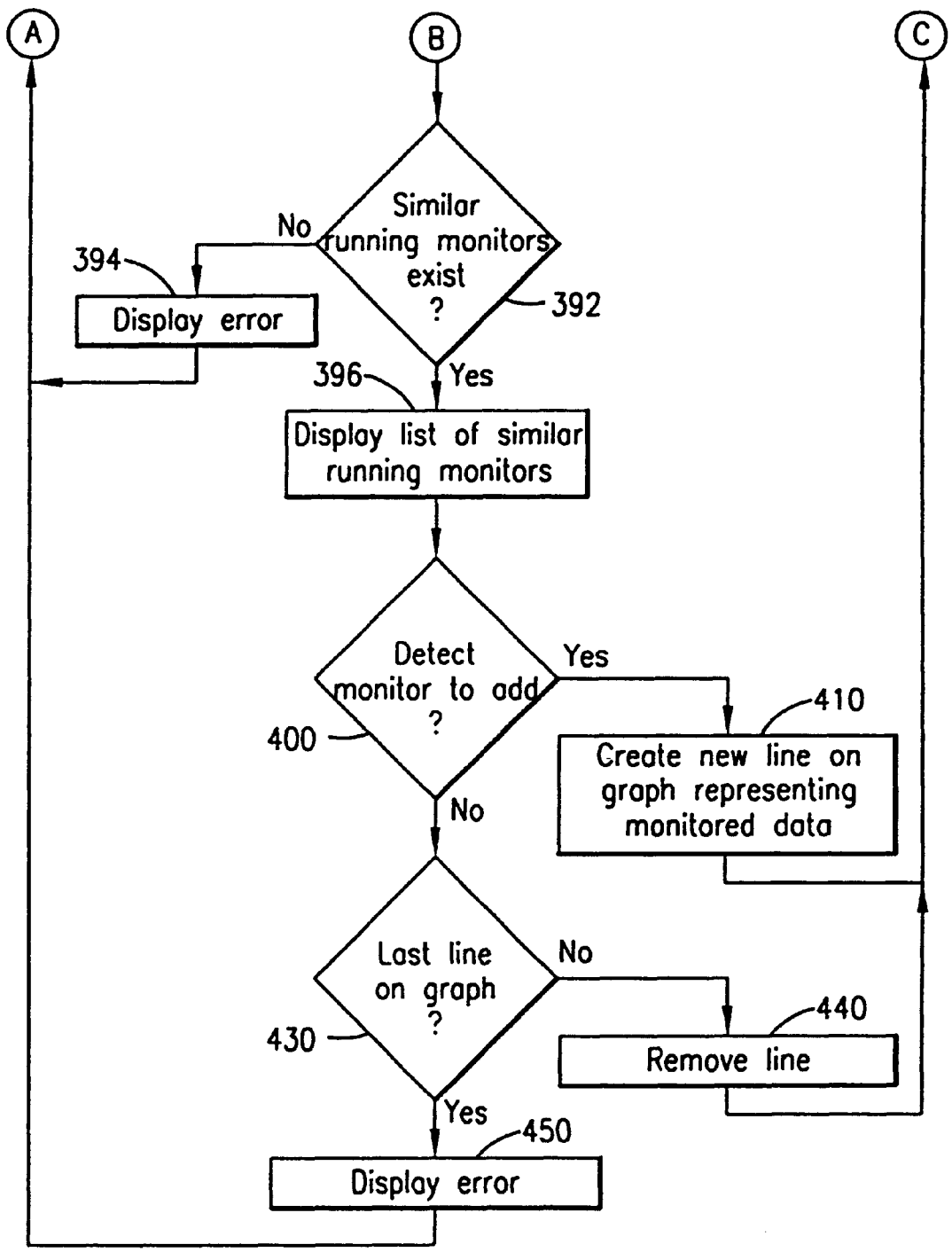

Referring additionally now to FIGS. 2A–B, there is illustrated a flow diagram of a method for effectuating a graphical display of multiple monitors associated with devices which are manageable using Simple Network Management Protocol over multiple intervals on a single graphical display consistent with the apparatus described in FIG. 1. An object, such as an opening parameter of a network device 160 or other SNMP manageable device 180, is selected by a user using the input device 130 for graphical display on the output device 120 (step 300). Default monitoring parameters such as a polling data interval are selected by the processor from the memory storage device 140 (step 310). A new monitor is created (step 312) and is added to a list of monitors (step 314). A new graph, associated with the new monitor, is created (step 316) and the new graph is added to a list of graphs (step 318). The selected object is added to a graphical display (step 320). A determination is made as to whether the user has supplied input data (step 330), and if so, a determination is made as to whether the user supplied data is a modified monitoring parameter (step 340). If it is determined that the user supplied data is a monitoring parameter, the respective parameter in the monitor is modified (step 350), otherwise, a determination is made as to whether the user supplied data is a monitor, representing a new line on the graphical display, which is to added or deleted (step 360).

If, in step 330, it is determined that the user has not supplied an input, or if, in step 360, the user supplied data is determined not to be monitor, or following step 350, the network data pertaining to the monitor is retrieved (step 370), display values are calculated (step 380) and the values are displayed on the graphical display (step 390). In step 380, the display values are calculated so that multiple lines representing multiple monitors having various sampling intervals are represented on a single coherent graph.

If, in step 360, it is determined that the user supplied input data is a monitor to be added or deleted to/from the graphical display, a determination is made as to whether other similar monitors, which are consistent with the parameters being monitored, are currently running (step 392) and if not an error is generated and displayed (step 394) and processing continues at step 330. Otherwise, if it is determined that other similar monitors, which are consistent with the parameters being monitored, are currently running, a list of similar monitors is display (step 396).

A determination is made as to whether the user supplied monitor is to be added to the graphical display, and if so, a new line is created on the graph for representing the monitored data step (410) and the graph is displayed beginning with the retrieval of network data in step 370. Otherwise, by default, the user supplied monitor is to be deleted and a determination is made as to whether the user supplied monitor represents the last line on the graph (step 430). If the monitor does represent the last line on the graph an error message is displayed (step 450) and the process continues at step 330. Otherwise, if the monitor does not represent the last line on the graph, the line represented by the monitor is removed (step 440) and processing continues at step 330.

Although the preferred embodiment of the apparatus and method of the present invention has been illustrated in the accompanying drawings and described in the foregoing detailed description, it is understood that the invention is not limited to the embodiment disclosed, but is capable of numerous rearrangements, modifications and substitutions without departing from the spirit of the invention as set forth and defined by the following claims.

I claim:

1. A network computer system comprising:
    an input device for selecting a plurality of monitored data sources;
    a processor for generating a line on a graph for each of the plurality of monitored data sources wherein a plurality of lines are formed on a single graph, each of the lines having a monitoring interval independent of the other lines and representing historical activity of each of the plurality of monitored data sources; and
    an output device for displaying the line of each of the plurality of monitored data sources on the single graph.

2. The network computer system of claim 1, wherein said processor further verifies whether a newly selected monitored data source is consistent with previously selected monitored data sources.

3. The network computer system of claim 1, wherein said input device is also for deleting at least one monitored data source.

4. The network computer system of claim 3, wherein said processor is also for ensuring that to be deleted the at least one monitored data source is not the last selected monitored data source.

5. The network computer system of claim 1, wherein at least one of the plurality of monitored data sources comprises an operating parameter.

6. The network computer system of claim 5, wherein said operating parameter is a polling data interval.

7. A method for displaying past activities of a plurality of monitored data sources, each of the plurality of monitored data sources generating a single line using one of a plurality of monitoring intervals on a single graphical display comprising:

selecting an object relating to a monitored data source to be displayed on a linear graph;

retrieving network data from a communication network pertaining to the selected object;

manipulating the retrieved network data so that it is coherent with previously retrieved and manipulated network data; and displaying all manipulated data graphically on the linear graph.

8. The method of claim 7, wherein said object comprises an operating parameter of a network device.

9. The method of claim 7, wherein said object comprises an operating parameter of a simple network management protocol manageable device.

10. The method of claim 7, wherein said step of selecting an object comprises the step of default monitoring parameters being selected by a processor.

11. The method of claim 7, further comprising the step of generating an error signal if retrieved network data cannot be manipulated to be coherent with previously retrieved and manipulated network data.

12. The method of claim 7, further comprising the step of modifying monitor parameters.

13. The method of claim 7, further comprising the step of deleting previously selected monitor objects.

14. The method of claim 13, further comprising the step of generating an error signal if an attempt is made to delete a last selected monitor object.

15. A computer system comprising:

an input device for selecting a plurality of monitored data sources, each one of the plurality of monitored data sources generating data that is represented by a line that is used to form a plurality of lines on a single graph;

a processor for generating the plurality of lines from all of the historical data that has been generated by the plurality of monitored data sources; and an output device for displaying the plurality of lines on the single graph.

* * * * *